United States Patent
Yamaki et al.

(10) Patent No.: US 8,897,042 B2
(45) Date of Patent: Nov. 25, 2014

(54) POWER SOURCE SYSTEM AND CONTROL CIRCUIT

(75) Inventors: Hiroshi Yamaki, Kawasaki (JP); Susumu Eguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 13/012,401

(22) Filed: Jan. 24, 2011

(65) Prior Publication Data

US 2011/0198924 A1  Aug. 18, 2011

(30) Foreign Application Priority Data

Feb. 12, 2010 (JP) .................................. 2010-29561

(51) Int. Cl.
*H02M 1/42* (2007.01)
*G06F 1/26* (2006.01)

(52) U.S. Cl.
CPC ............ *H02M 1/4266* (2013.01); *Y02B 70/123* (2013.01); *G06F 1/26* (2013.01)
USPC ............................................ 363/89; 323/205

(58) Field of Classification Search
USPC ............. 363/89, 125–127, 65, 67, 69, 44, 45, 363/46, 47, 48; 323/205, 207, 271, 273, 323/908; 364/93.9
See application file for complete search history.

(56) References Cited

U.S. PATENT DOCUMENTS

| | | | |
|---|---|---|---|
| 5,302,920 A * | 4/1994 | Bitting | 331/45 |
| 5,798,635 A * | 8/1998 | Hwang et al. | 323/222 |
| 5,991,175 A * | 11/1999 | Liu | 363/56.1 |
| 6,008,590 A * | 12/1999 | Giannopoulos et al. | 315/209 R |
| 6,362,980 B1 | 3/2002 | Ohashi et al. | |
| 6,421,259 B1 * | 7/2002 | Brooks et al. | 363/84 |
| 6,714,429 B2 * | 3/2004 | Phadke | 363/89 |
| 6,853,167 B2 * | 2/2005 | Elek et al. | 323/207 |
| 7,379,311 B2 * | 5/2008 | Shih | 363/52 |
| 7,609,499 B2 * | 10/2009 | Hussein et al. | 361/93.9 |
| 2004/0003306 A1 | 1/2004 | Oomori | |
| 2010/0244789 A1 * | 9/2010 | Osaka | 323/271 |
| 2010/0309700 A1 | 12/2010 | Maeda et al. | |

FOREIGN PATENT DOCUMENTS

| | | |
|---|---|---|
| JP | 8-308107 A | 11/1996 |
| JP | 10-257672 A | 9/1998 |
| JP | 2000-004585 | 1/2000 |
| JP | 2001-169549 | 6/2001 |
| JP | 2004-38331 A | 2/2004 |

(Continued)

OTHER PUBLICATIONS

Korean Office Action mailed by Korean Patent Office and corresponding to Korean Application No. 10-2011-0011889 on Dec. 26, 2012, with English translation.

(Continued)

*Primary Examiner* — Matthew Nguyen
*Assistant Examiner* — Kyle J Moody
(74) *Attorney, Agent, or Firm* — Fujitsu Patent Center

(57) ABSTRACT

A power source system including power-factor modifying circuits to modify a power factor of supplied electric power, a time difference circuit to output start signals for instructing the power-factor modifying circuits to start an operation to the power-factor modifying circuits at specified time intervals, and a control circuit to supply the electric power to the power-factor modifying circuit to start the power-factor modifying circuit when the power-factor modifying circuit acquires the start signal output from the time difference circuit.

8 Claims, 10 Drawing Sheets

(56) References Cited

FOREIGN PATENT DOCUMENTS

| JP | 2009-176263 | | 8/2009 |
| JP | 2009-183115 A | | 8/2009 |
| JP | 2010-16920 A | | 1/2010 |
| KR | 10-2006-00382 95 | * | 5/2006 |
| KR | 10-2006-0038295 | | 5/2006 |

OTHER PUBLICATIONS

Japanese Office Action mailed Nov. 26, 2013 for corresponding Japanese Application No. 2010-029561, with Partial English-language Translation.

Japanese Office Action issued Mar. 11, 2014 for corresponding of Japanese Application No. 2010-029561, with Partial English Translation, 5 pages Japanese Office Action mailed May 27, 2014 for corresponding Japanese Patent Application No. 2010-029561, with Partial English Translation, 4 pages.

Japanese Office Action mailed Oct. 1, 2013 for corresponding Japanese Application No. 2010-029561, with Partial English-language Translation.

* cited by examiner

US 8,897,042 B2

POWER SOURCE SYSTEM AND CONTROL CIRCUIT

CROSS-REFERENCE TO RELATED APPLICATION

This application is based upon and claims the benefit of priority of the prior Japanese Patent Application No. 2010-29561, filed on Feb. 12, 2010, the entire contents of which are incorporated herein by reference.

FIELD

An embodiment of the invention relates to a power source system and a power source control circuit.

BACKGROUND

A power source system with a Power Supply Unit (PSU) serving as an AC/DC (Alternating Current/Direct Current) power source is known as a power source system for a server. The power source system for a server includes a plurality of PSUs for a redundant operation or two-way power reception because a server requires high reliability.

The PSUs of the power source system perform full-wave rectification on an alternating voltage applied from an alternating-current power source, supply the full-wave rectified voltage to a primary winding of a transformer to induce a voltage across a secondary winding of the transformer, and convert the induced voltage into a direct voltage to generate a direct voltage required by the server. In the power source system for a server, power factor improvement is performed to improve efficiency which may be degraded, and thus a Power Factor Correction circuit (hereinafter referred to as a "PFC circuit") that performs power factor improvement is provided between the input side of the PSU and the transformer. A voltage smoothing capacitor is provided between the input side of the PSU and the transformer. In the case where a current is applied to the PFC circuit when the PSU is started with an AC, a high current momentarily flows through the smoothing capacitor, and therefore an inrush current to the input section is generated.

In a power source system with a plurality of such PSUs, when the PSUs are started at the same time, inrush currents to the plurality of PSUs are generated at overlapped timing. Therefore, a high inrush current that is proportional to the number of the PSUs provided in the power source system is generated. When a power source system which normally consumes electric power of 1.5 kVA is started, for example, a high inrush current may be momentarily generated to consume electric power of more than 2 kVA.

A power source system provided with an Uninterruptible Power Supply (hereinafter referred to as a "UPS") for security of an operation at the time of an input power failure is known. The UPS has an overcurrent protection function for protecting the UPS from an inrush current to a load device. When the overcurrent protection function of the UPS is activated, supply of electric power to the power source system is blocked.

Therefore, the power source system is provided with a UPS with a capacity that can cover a possible inrush current. For a power source system which normally consumes electric power of 1.5 kVA, for example, a UPS with a capacity of 2 kVA may not be used but a UPS that can cover electric power of up to 3 kVA should be provided if the power source system includes devices for which a high inrush current may be generated. Likewise, since a high inrush current may be generated for a power source system with a plurality of PSUs, the power source system may be connected to a power distribution switchboard with a large capacity that can cover a high current.

A power source system is disclosed in Japanese Unexamined Patent Application Publication No. 2001-169549.

However, the power source system discussed above is provided with a UPS with a large capacity or a power distribution switchboard with a large capacity to cover a high inrush current, and thus the circuit size of the power source system may be disadvantageously large.

SUMMARY

According to an aspect of the technology disclosed herein, a power source system including power-factor modifying circuits to modify a power factor of supplied electric power, a time difference circuit to output start signals for instructing the power-factor modifying circuits to start an operation to the power-factor modifying circuits at specified time intervals, and a control circuit the electric power to the power-factor modifying circuit to start the power-factor modifying circuit when the power-factor modifying circuit acquires the start signal output from the time difference circuit is provided.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

DESCRIPTION OF EMBODIMENTS

A power source system according to an embodiment of the invention will be described with reference to FIG. 1.

The power source system according to a first embodiment includes a plurality of power sources. The power source system according to the first embodiment has a power-factor modifying circuit that modifies the power factor of electric power for each power source, and supplies electric power to other devices.

Figure 1:
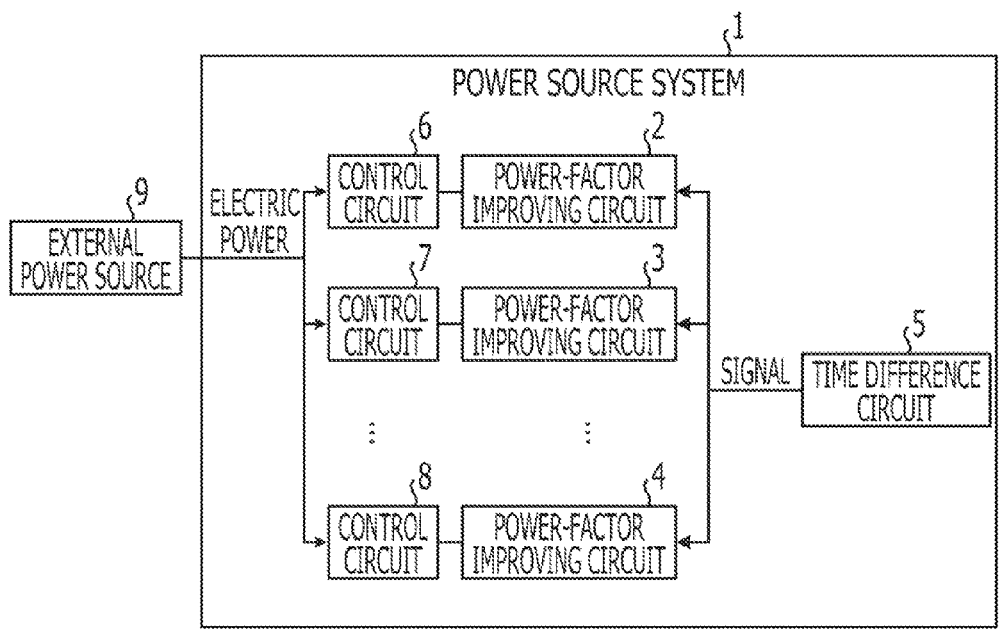
FIG. 1 illustrates a power source system according to a first embodiment of the invention.

The power source system 1 illustrated in FIG. 1 includes a plurality of power-factor modifying circuits 2 to 4, a time difference circuit 5, and a plurality of control circuits 6 to 8. The control circuits 6 to 8 correspond to one of the power-factor modifying circuits 2 to 4, respectively. The power source system 1 is connected to an external power source 9 that supplies electric power to the power source system 1. Each of the power-factor modifying circuits 2 to 4 modifies the power factor of electric power supplied from outside of the power source system 1. The time difference circuit 5 sequentially outputs start signals for instructing the power-factor modifying circuits 2 to 4 to start an operation to the power-factor modifying circuits 2 to 4 at specified time intervals.

The control circuit 6 supplies electric power supplied from the external power source 9 to the power-factor modifying circuit 2 to start an operation of the power-factor modifying circuit 2 when the power-factor modifying circuit 2 acquires the start signal output from the time difference circuit 5. The control circuit 7 supplies electric power supplied from the external power source 9 to the power-factor modifying circuit 3 to start an operation of the power-factor modifying circuit 3 when the power-factor modifying circuit 3 acquires the start signal output from the time difference circuit 5. The control circuit 8 supplies electric power supplied from the external power source 9 to the power-factor modifying circuit 4 to start an operation of the power-factor modifying circuit 4 when the power-factor modifying circuit 4 acquires the start signal output from the time difference circuit 5.

In the power source system 1 according to the first embodiment, electric power may be supplied to the power-factor modifying circuits 2 to 4 at times shifted from each other. Thus, inrush currents to the power-factor modifying circuits 2 to 4 may be generated at times shifted from each other, which prevents an inrush current generated in the power source system 1 from becoming high. In the power source system 1 according to the first embodiment, the generated inrush current can be reduced to a level substantially corresponding to one power-factor modifying circuit. Therefore, if an uninterruptible power supply system or a power distribution switchboard that covers an inrush current is to be provided, an uninterruptible power supply system or a power distribution switchboard may be provided that covers an inrush current corresponding to one power-factor modifying circuit, which reduces the circuit size.

A power source system according to a second embodiment will be described with reference to FIG. 2. The power source system of FIG. 2 includes a plurality of PSUs, and power factor improvement is performed in each of the PSUs.

Figure 2:
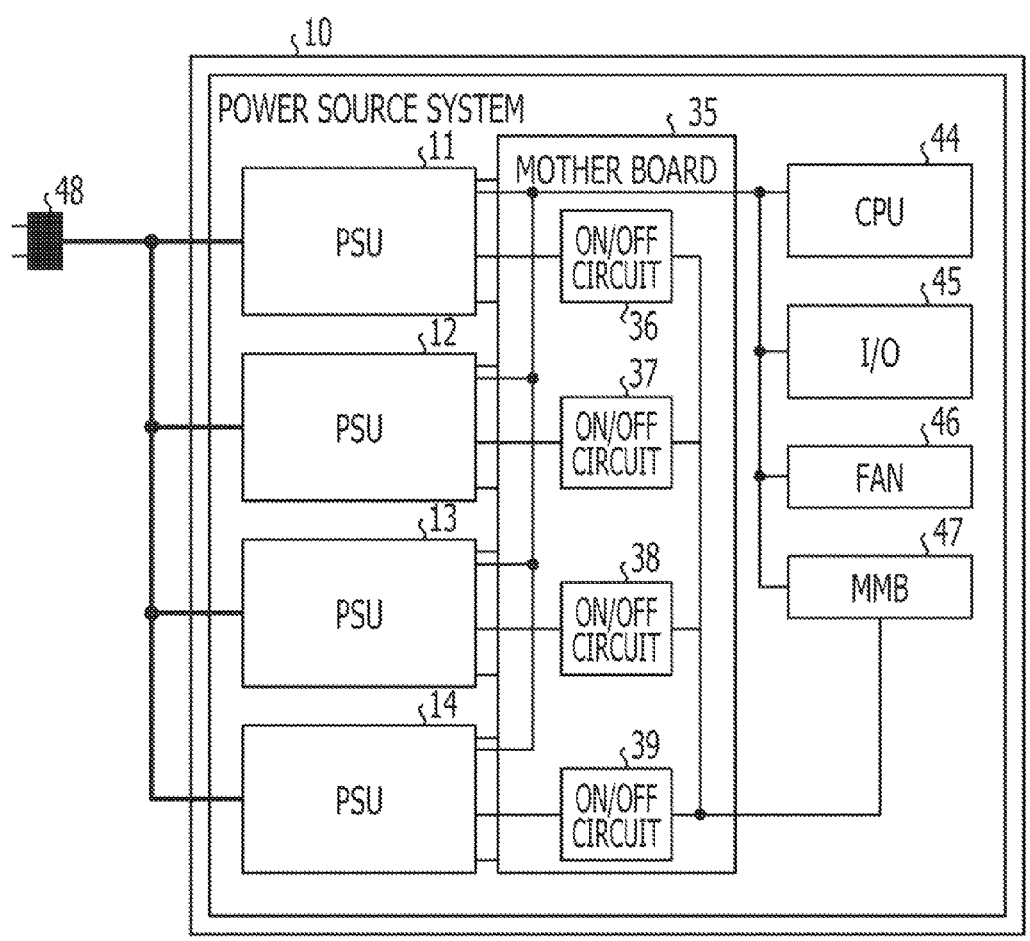
FIG. 2 illustrates a power source system according to a second embodiment of the invention.

In the example illustrated in FIG. 2, a power source system 10 includes four PSUs 11 to 14, a Mother Board (MB) 35, a Central Processing Unit (CPU) 44, an Input/Output unit (I/O) 45, a FAN 46, a Management Board (MMB) 47, and a plug-in wiring connector 48. The MB 35 is connected to the PSUs 11 to 14, the CPU 44, the I/O 45, and the FAN 46. The MB 35 includes on/off circuits 36 to 39. The on/off circuits 36 to 39 are connected to the corresponding PSUs 11 to 14, respectively.

The MMB 47 controls the various components of the power source system 10. The CPU 44 performs a computation process. The I/O 45 may be a medium such as an HDD. The FAN 46 cools the power source system 10. The plug-in wiring connector 48 supplies electric power to each of the PSUs 11 to 14 provided in the power source system 10. The MB 35 supplies voltages output from the PSUs 11 to 14 to the CPU 44, the I/O 45, the FAN 46, and the MMB 47.

The PSU 11 includes a power-factor modifying circuit that modifies the power factor of electric power supplied to the input circuit section. The PSU 11 also includes a control circuit that supplies electric power to start the power-factor modifying circuit when a signal for turning on electric power from the on/off circuit 36 is received. The PSU 11 further applies a voltage AC_OK that is higher than a specified threshold, as a signal indicating that the PSU 11 has been started, to the on/off circuit 36, as discussed later in relation to FIG. 4, when electric power is supplied from the plug-in wiring connector 48. The specified threshold is a value of a voltage required to turn on an FET.

The PSU 12 includes a plurality of power-factor modifying circuits. Each power-factor modifying circuit modifies the power factor of electric power supplied from the outside, as with the PSU 11. The PSU 12 also includes a control circuit that supplies electric power supplied from outside to the power-factor modifying circuit to start the power-factor modifying circuit when the power-factor modifying circuit acquires a start signal output from the on/off circuit 37. The PSU 12 further applies a voltage AC_OK that is higher than a specified threshold, as a signal indicating that the PSU 12 has been started, to the on/off circuit 37, as discussed later in relation to FIG. 4, when electric power is supplied from the plug-in wiring connector 48, as with the PSU 11.

The PSU 13 includes a plurality of power-factor modifying circuits each modifying the power factor of electric power supplied from the outside, as with the PSU 11. The PSU 13 also includes a control circuit that supplies electric power supplied from the outside to the power-factor modifying circuit to start the power-factor modifying circuit when the power-factor modifying circuit acquires a start signal output from the on/off circuit 38. The PSU 13 further applies a voltage AC_OK that is higher than a specified threshold, as a signal indicating that the PSU 13 has been started, to the on/off circuit 38, as discussed later in relation to FIG. 4, when electric power is supplied from the plug-in wiring connector 48, as with the PSU 11.

The PSU 14 includes a plurality of power-factor modifying circuits. Each power-factor modifying circuit modifies the power factor of electric power supplied from outside, as with the PSU 11. The PSU 14 also includes a control circuit that supplies electric power supplied from the outside to the power-factor modifying circuit to start the power-factor modifying circuit when the power-factor modifying circuit acquires a start signal output from the on/off circuit 39. The PSU 14 further applies a voltage AC_OK that is higher than a specified threshold, as a signal indicating that the PSU 14 has been started, to the on/off circuit 39, as discussed later in relation to FIG. 4, when electric power is supplied from the plug-in wiring connector 48, as with the PSU 11. The PSU 11 to PSU 14 of the embodiment may have substantially the same configuration, and exhibit substantially the same function.

Figure 3:
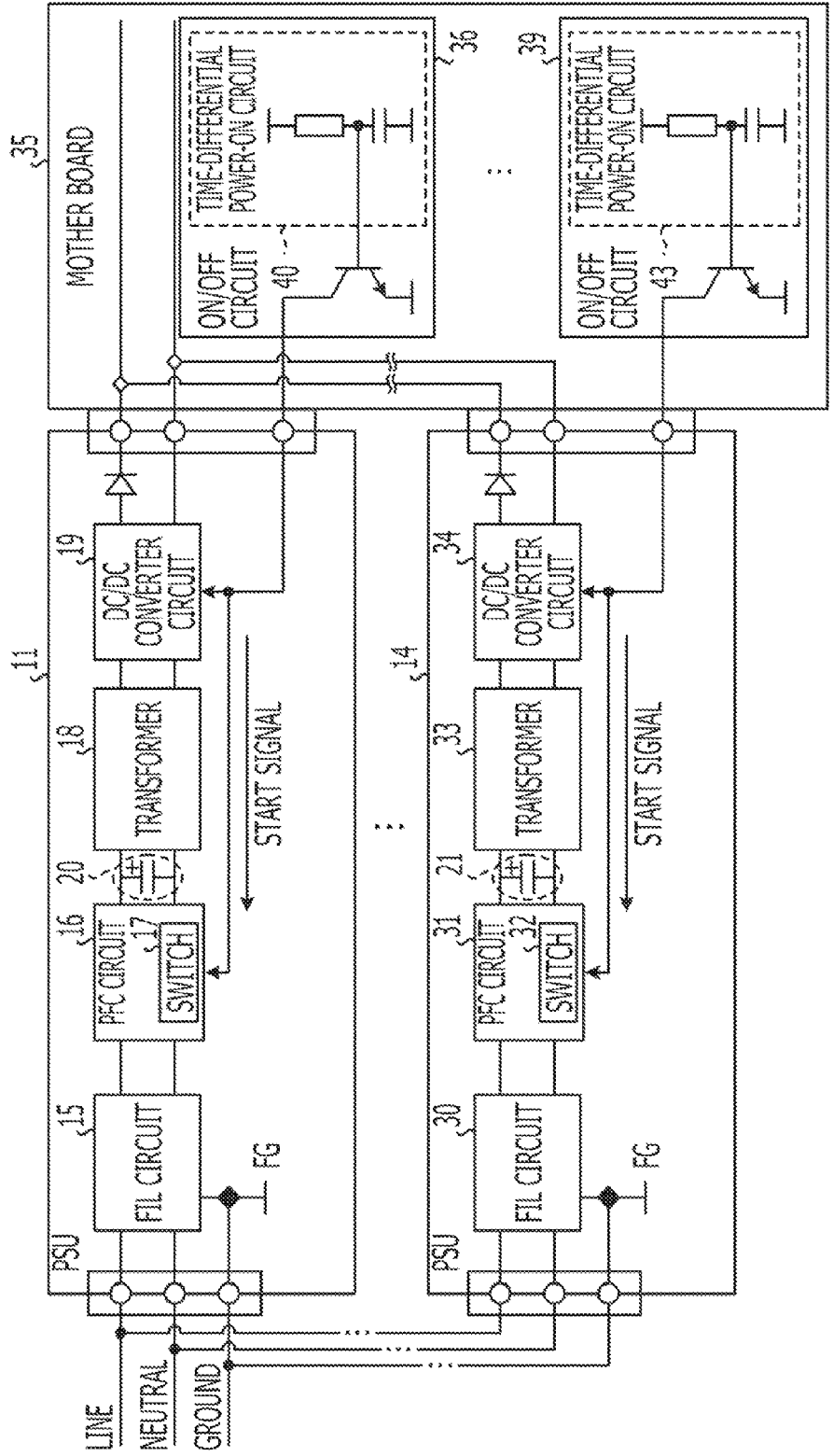
FIG. 3 illustrates an operation of PSUs and on/off circuits according to the second embodiment.

The PSUs 11 to 14 will be described below with reference to FIG. 3. FIG. 3 illustrates an operation of the PSUs and the on/off circuits. The PSU 11 illustrated in FIG. 3 includes a filter (FIL) circuit 15, a Power Factor Correction (PFC) circuit 16, a transformer 18, and a DC/DC converter circuit 19. The PFC circuit 16 includes a switch 17. The PSU 11 is connected to the on/off circuit 36. The other PSUs 12 to 14 are also connected to the corresponding on/off circuits 37 to 39, respectively.

The FIL circuit 15 is a filter circuit that removes noise in externally supplied electric power. The FIL circuit 15 removes noise in electric power supplied from the plug-in wiring connector 48 to transmit stabilized input electric power to the PFC circuit 16.

The PFC circuit 16 is a power-factor modifying circuit that modifies the power factor of electric power supplied from the outside. The PFC circuit 16 acquires a current fed from the FIL circuit 15 via the switch 17 when a start signal for instructing the PFC circuit 16 to start an operation is acquired from the on/off circuit 36 to be discussed later.

The PFC circuit 16 modifies the power factor by approximating the waveform of the current acquired via the switch 17 to a sinusoidal wave of the same phase as the voltage waveform. Thereafter, the PFC circuit 16 transmits the current with a modified power factor to the transformer 18 via a smoothing capacitor 20.

The switch 17 is switched on and off based on the start signal outputted from the on/off circuit 36. When the switch 17 is turned on, the switch 17 supplies electric power supplied from the outside to the PFC circuit 16 to start the PFC circuit 16. The switch 17 continuously acquires PS_ON (to be discussed later) from the on/off circuit 36.

When PS_ON serving as the start signal is transitioned from the High state to the Low state, the switch 17 is switched on to transfer the current transmitted from the FIL circuit 15 to the PFC circuit 16. When PS_ON is transitioned from the High state to the Low state, the switch 17 connects the FIL circuit 15 and the PFC circuit 16 to each other to transmit the current transferred from the FIL circuit 15 to the PFC circuit 16.

When the switch 17 connects the FIL circuit 15 and the PFC circuit 16 to each other, a voltage is applied to the PFC circuit 16 and the smoothing capacitor 20. Therefore, an inrush current to the PFC circuit 16 is generated. The on/off circuit 36 controls the time at which an inrush current is generated by controlling the time at which the switch 17 connects the FIL circuit 15 and the PFC circuit 16 to each other on the basis of the input start signal.

The transformer 18 transforms a voltage corresponding to the current acquired from the PFC circuit 16 via the smoothing capacitor 20 into a specified voltage. The transformer 18 then outputs a current corresponding to the voltage obtained as a result of the transformation to the DC/DC converter circuit 19.

The DC/DC converter circuit 19 transforms the voltage supplied from the transformer 18. The DC/DC converter circuit 19 acquires a current corresponding to the voltage obtained as a result of the transformation performed by the transformer 18 from the transformer 18. When the start signal is acquired from the on/off circuit 36, the DC/DC converter circuit 19 converts the current acquired from the transformer 18 from an alternating current into a direct current, and converts the direct current obtained as a result of the conversion into a direct current corresponding to a specified voltage. For example, the DC/DC converter circuit 19 converts a voltage of 380 VDC, which has been obtained as a result of the PFC circuit 16 boosting an input voltage of 200 V, into 12 VDC.

Each of the PSUs 12 and 13 has the same configuration as the PSU 11. Specifically, each of the PSUs 12 and 13 includes a FIL circuit, a PFC circuit, a switch, a smoothing capacitor, a transformer, and a DC/DC converter circuit as with the PSU 11, and exhibits the same function as the PSU 11. The PSUs 12 and 13 are not illustrated in FIG. 3. The PSU 14 also includes a FIL circuit 30, a PFC circuit 31, a switch 32, a smoothing capacitor 21, a transformer 33, and a DC/DC converter circuit 34 as with the PSU 11, and exhibits the same function as the PSU 11.

The MB 35 includes the plurality of on/off circuits 36 to 39 which respectively correspond to one of the PSUs and which output start signals for instructing the PFC circuits to start an operation to the corresponding PSUs. The MB 35 sequentially outputs start signals for instructing the PFC circuits to start an operation to the PFC circuits at specified time intervals. The MB 35 sequentially outputs start signals to the PFC circuits at time intervals that are longer than the time period since generation until settlement of an inrush current generated when electric power is supplied to each of the PFC circuits. The MB 35 also outputs start signals for instructing the DC/DC converter circuits to start an operation along with sequentially outputting start signals for instructing the PFC circuits to start an operation.

The on/off circuits 36 to 39 include time-differential power-on circuits 40 to 43, respectively. Each of the time-differential power-on circuits 40 to 43 has a capacitor with a capacitance that is different from the capacitances of the capacitors of the other time-differential power-on circuits. When electric power is supplied to each of the PSUs 11 to 14, a voltage is applied to each of the capacitors. An output transistor is connected to each of the time-differential power-on circuits 40 to 43. The transistor is turned on and off in accordance with variations in voltage of the capacitor, to which a voltage is applied, which causes each of the on/off circuits 36 to 39 to output a start signal. Since the capacitance of each capacitor of the time-differential power-on circuits 40 to 43 are different from each other, the on/off circuits 36 to 39 sequentially output start signals to the PFC circuits 16 to 31 corresponding to the on/off circuits 36 to 39 at different times.

Hereinafter, the on/off circuit 36 will be described, and the other on/off circuits 37 to 39 will not be described in detail.

The on/off circuit 36 outputs a start signal for instructing the PFC circuit 16 to start an operation to the PFC circuit 16. The on/off circuit 36 applies a voltage to the capacitor of the time-differential power-on circuit 40, and outputs a start signal for instructing the PFC circuit 16 to start an operation to the PFC circuit 16 in accordance with variations in voltage of the capacitor.

The circuitry and the operation of the on/off circuit 36 will be described with reference to FIG. 4. In the example illustrated in FIG. 4, a portion A corresponds to a circuit portion provided in the PSU 11, and a range B corresponds to a circuit portion provided in the on/off circuit 36.

Figure 4:
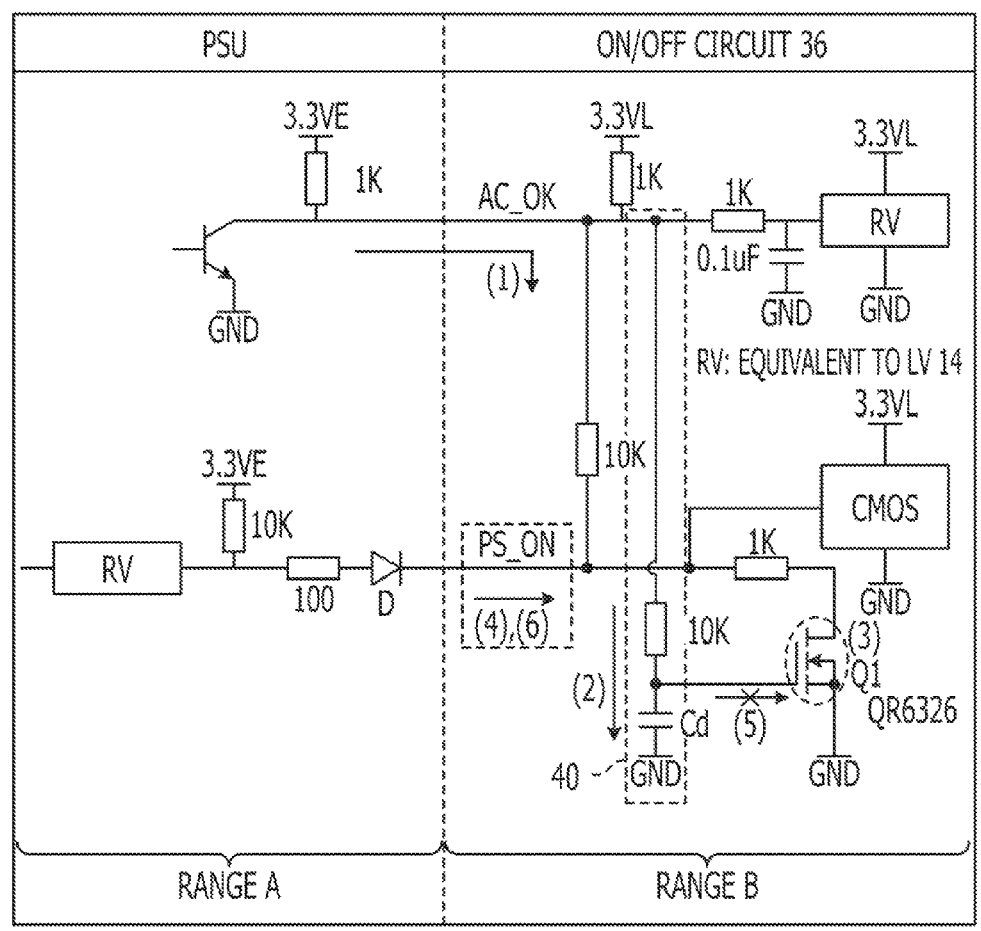
FIG. 4 is a circuit diagram illustrating an on/off circuit according to the second embodiment.

Because the transistor illustrated in the portion A is turned on when electric power is supplied to the PSU 11, a voltage AC_OK that is higher than a specified threshold is applied from the PSU 11 to the on/off circuit 36 (see (1) in FIG. 4).

The on/off circuit 36 uses AC_OK applied to the on/off circuit 36 to charge a capacitor Cd provided in the time-differential power-on circuit 40 (see (2) in FIG. 4). The on/off circuit 36 also applies AC_OK to Q1 illustrated in FIG. 4. The on/off circuit 36 applies, as the gate voltage of an FET illustrated in Q1 of FIG. 4, a voltage AC_OK in the High state that is higher than a voltage required to turn on the FET (see (3) in FIG. 4). Therefore, Q1 is turned on, which brings PS_ON flowing into the on/off circuit 36 to the High state (see (4) in FIG. 4).

Thereafter, when the capacitor Cd is fully charged, a current no longer flows from the time-differential power-on circuit 40 to the FET, which brings the voltage applied to the gate of Q1 to the Low state, in which the voltage is lower than the specified threshold (see (5) in FIG. 4). Then, Q1 is turned off, which causes PS_ON to transition from the High state to the Low state in the on/off circuit 36 (see (6) in FIG. 4).

The switch 17 connects the FIL circuit 15 and the PFC circuit 16 to each other when PS_ON is transitioned from the High state to the Low state. The on/off circuit 36 can start the PFC circuit 16 by causing PS_ON, which serves as a start signal, to transition from the High state to the Low state to cause the switch 17 to connect the FIL circuit 15 and the PFC circuit 16 to each other.

The on/off circuit 36 applies a voltage to the capacitor Cd provided in the time-differential power-on circuit 40. The on/off circuit 36 then starts the PFC circuit 16 by causing PS_ON to transition from the High state to the Low state at a time matching the capacitance of the capacitor Cd.

The on/off circuit 36 does not instruct the PFC circuit 16 to start an operation but waits during a period since the power source system 10 is started until the capacitor Cd provided in the time-differential power-on circuit 40 is fully charged. Then, when the capacitor Cd provided in the time-differential power-on circuit 40 is fully charged, the on/off circuit 36 causes the PFC circuit 16 to start an operation by causing the start signal PS_ON being output to transition from the High state to the Low state.

In the case where the capacitance of the capacitor Cd of the time-differential power-on circuit 40 is 0.1 μF, the on/off circuit 36 outputs a start signal for the PFC circuit 16 about several milliseconds after the power source system 10 is started. The on/off circuit 36 causes PS_ON to transition from the High state to the Low state about several milliseconds after the power source system 10 is started.

The on/off circuit 37 outputs a start signal for instructing the PFC circuit 21 to start an operation to the PFC circuit 21, as with the on/off circuit 36. The on/off circuit 37 includes a capacitor with a capacitance corresponding to the PFC circuit 21, and applies a voltage to the capacitor, and outputs a start signal for instructing the PFC circuit 21 to start an operation to the PFC circuit 21 in accordance with variations in voltage of the capacitor.

In the case where the capacitance of the capacitor Cd of the time-differential power-on circuit 41 of the on/off circuit 37 is 40 μF, the on/off circuit 37 outputs a start signal for instructing the PFC circuit 21 to start an operation 245 ms after the on/off circuit 36 outputs a start signal. The on/off circuit 37 causes PS_ON to transition from the High state to the Low state 245 ms after the on/off circuit 36 causes PS_ON to transition from the High state to the Low state.

The on/off circuit 38 outputs a start signal for instructing the PFC circuit 26 to start an operation to the PFC circuit 26, as with the on/off circuit 36.

In the case where the capacitance of the capacitor Cd of the time-differential power-on circuit 42 of the on/off circuit 38 is 87 μF, the on/off circuit 38 outputs a start signal for instructing the PFC circuit 26 to start an operation 245 ms after the on/off circuit 37 outputs a start signal for instructing the PFC circuit 21 to start an operation. The on/off circuit 38 causes PS_ON to transition from the High state to the Low state 245 ms after the on/off circuit 37 causes PS_ON to transition from the High state to the Low state.

The on/off circuit 39 outputs a start signal for instructing the PFC circuit 31 to start an operation to the PFC circuit 31, as with the on/off circuit 36. In the case where the capacitance of the capacitor Cd of the time-differential power-on circuit 43 of the on/off circuit 39 is 114 μF, the on/off circuit 39 outputs a start signal for instructing the PFC circuit 31 to start an operation 245 ms after the on/off circuit 38 outputs a start signal. The on/off circuit 39 causes PS_ON to transition from the High state to the Low state 245 ms after the on/off circuit 38 causes PS_ON to transition from the High state to the Low state.

As discussed above, the time-differential power-on circuits 40 to 43 of the on/off circuits 36 to 39 each includes a capacitor with a capacitance corresponding to the time at which a start signal is output to the corresponding PFC circuit. When electric power is supplied to each of the PSUs 11 to 14, the on/off circuits 36 to 39 start applying a voltage to the capacitors of the time-differential power-on circuits 40 to 43 at the same time.

Since the capacitances of the capacitors of the time-differential power-on circuits 40 to 43 are different from each other, the on/off circuits 36 to 39 output start signals for instructing the PFC circuits 19 to 31 to start an operation at different times. Consequently, the MB 35 can vary the times at which the PFC circuits 19 to 31 are started by varying the capacitances of the capacitors provided in the time-differential power-on circuits 40 to 43 of the on/off circuits 36 to 39.

By appropriately determining the capacitances of the capacitors provided in the time-differential power-on circuits 40 to 43, the MB 35 can shift the times at which inrush currents to the PFC circuits 19 to 31 are generated. In addition, by shifting the times at which inrush currents to the PFC circuits 19 to 31 are generated, the MB 35 can reduce an inrush current generated when the power source system 10 is started to a level corresponding to one PSU.

For example, in the case where the capacitances of the capacitors provided in the time-differential power-on circuits 40 to 43 are set to 0.1 μF, 40 μF, 87 μF, and 114 μF, respectively, the MB 35 can shift the times at which the PFC circuits 16 to 31 are started by 245 ms each. In general, an inrush current is settled in about 100 ms after a PFC circuit is started. Therefore, by shifting the times to start the PFC circuits by 245 ms each, the MB 35 can reduce a momentary inrush current generated when the power source system 10 is started to a level corresponding to one PSU.

The MB 35 is configured to charge the capacitors provided in the time-differential power-on circuits 40 to 43 using AC_OK applied from the PSUs 11 to 14 when the power source system 10 is started. Therefore, the MB 35 can sequentially start the PFC circuits 16 to 31 in conjunction with starting of the power source system 1.

Examples of electronic circuits for forming the FIL circuits 15 to 30, the PFC circuits 16 to 31, the switches 17 to 32, the DC/DC converter circuits 19 to 34, the MB 35, the on/off circuits 36 to 39, the time-differential power-on circuits 40 to 43, and the CPU 44 include an integrated circuit such as an ASIC (Application Specific Integrated Circuit) and an FPGA (Field Programmable Gate Array), a CPU (Central Processing Unit), and an MPU (Micro Processing Unit).

The I/O 45 is a unit that allows use of an HDD or a PCI card. The FAN 46 is a cooling fan that cools the entire power source system 10. As a cooling mechanism for the power source system 10, for example, a water-cooling cooling device or the like may also be used rather than a cooling fan.

The times at which the power source system 10 starts the PFC circuits 16 to 31 of the PSUs 11 to 14 will be described with reference to FIG. 5.

Figure 5:
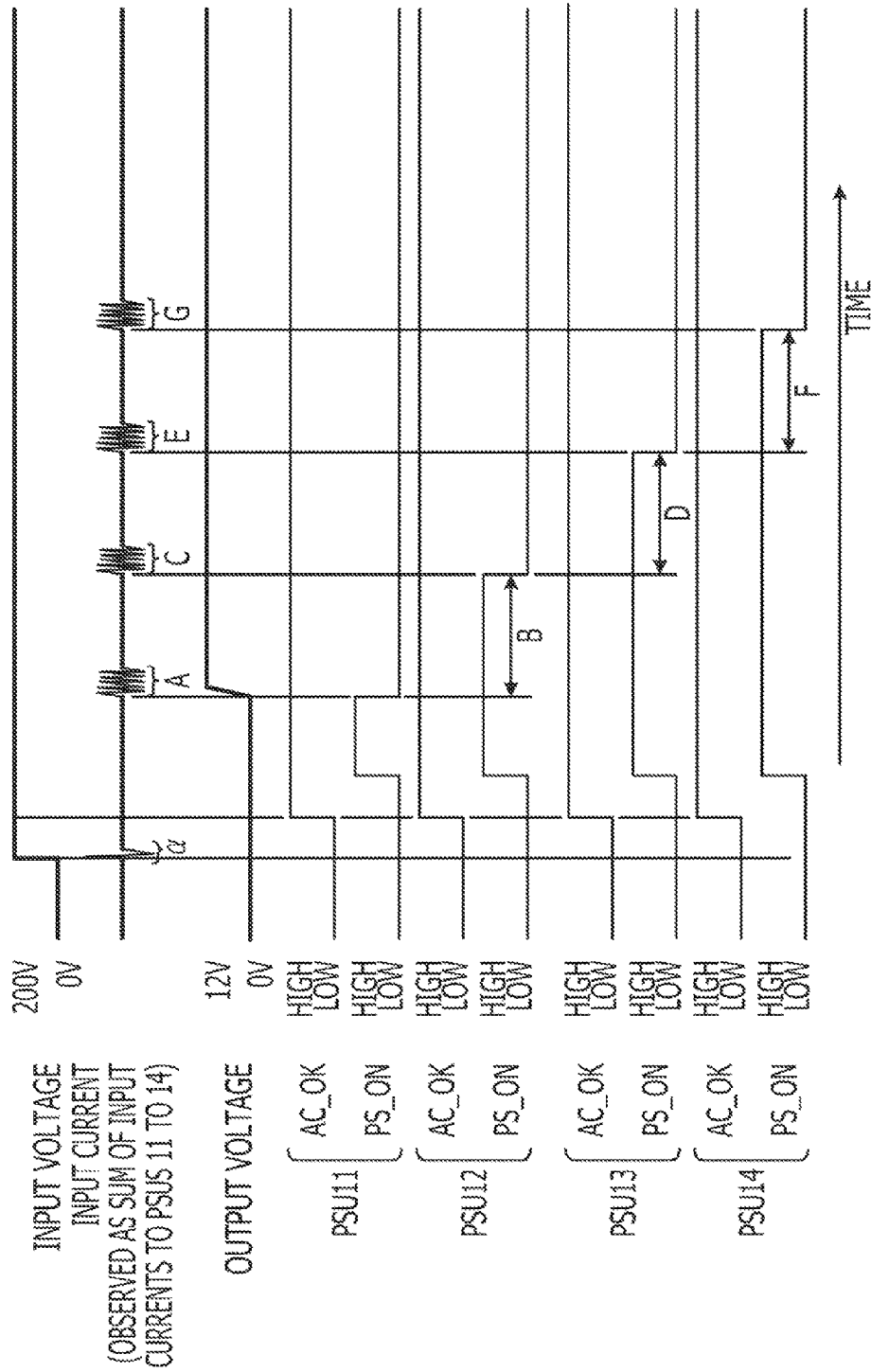
FIG. 5 is a timing chart of a process performed by the power source system according to the second embodiment.

The term "input voltage" used in FIG. 5 indicates a voltage applied from the plug-in wiring connector 48 to the power source system 10. The term "input current" used in FIG. 5 indicates a current flowing through the power source system 10. Generated inrush currents to the PSUs 11 to 14 are also acquired as the input current. The term "output voltage" used in FIG. 5 indicates a voltage output from the power source system 10.

In the example illustrated in FIG. 5, the states of AC_OK and PS_ON applied from the PSUs 11 to 14 to the on/off circuits 36 to 39 are illustrated. The symbol "α" used in FIG. 5 indicates an inrush current generated for components other than the PFC circuits 16 to 31 when the power source system 10 is started as an initial input current.

When the power source system 10 is started, a voltage of 200 V is applied from the plug-in wiring connector 48 to the power source system 10. Next, the power source system 10 causes the voltages AC_OK of the PSUs 11 to 14 to transition to the High state, in which AC_OK is higher than a specified threshold. Then, the voltages PS_ON of the PSUs 11 to 14 are caused to transition from the Low state to the High state.

In the power source system 10, the capacitor forming the time-differential power-on circuit of the on/off circuit 36 corresponding to the PSU 11 is charged. When PS_ON of the PSU 11 is transitioned from the High state to the Low state, the PFC circuit 16 of the PSU 11 is started. At this time, the voltages PS_ON corresponding to the other PSUs 12 to 14 are in the High state, and thus the PSUs 12 to 14 are not started. Therefore, as indicated by A in FIG. 5, only an inrush current to the PSU 11 is generated.

Thereafter, as indicated by B in FIG. 5, the capacitor forming the time-differential power-on circuit of the on/off circuit 37 corresponding to the PSU 12 is charged 245 ms after PS_ON of the PSU 11 is transitioned to the Low state, and PS_ON of the PSU 12 is transitioned from the High state to the Low state. Accordingly, the PFC circuit 21 of the PSU 12 is started. Therefore, as indicated by C in FIG. 5, only an inrush current to the PSU 12 is generated. In this state, no inrush current to the PSU 11 is generated because the PSU 11 has already been started, and the PSUs 13 and 14 have not been started yet.

Similarly, the power source system 10 starts the PFC circuit 26 of the PSU 13 245 ms after PS_ON of the PSU 12 is transitioned to the Low state (as indicated by D in FIG. 5). Therefore, as indicated by E in FIG. 5, only an inrush current to the PSU 13 is generated. In addition, the power source system 10 starts the PFC circuit 31 of the PSU 14 245 ms after PS_ON of the PSU 13 is transitioned to the Low state (as indicated by F in FIG. 5). Therefore, as indicated by G in FIG. 5, only an inrush current to the PSU 14 is generated.

In this way, the power source system 10 sequentially starts the PFC circuits 16 to 31 of the PSUs 11 to 14 at time intervals that are longer than the time period since generation until settlement of an inrush current to each of the PSUs 11 to 14. Therefore, the power source system 10 can start the PSUs 11 to 14 such that inrush currents to the PSUs 11 to 14 do not overlap each other. Consequently, the power source system 10 can start the PSUs 11 to 14 without generating a high inrush current.

Inrush currents generated in a power source system not according to the embodiment and inrush currents generated in the power source system 10 according to the embodiment will be described. In the following description, the power source system not according to the embodiment includes four PSUs #0 to #3.

Figure 6:
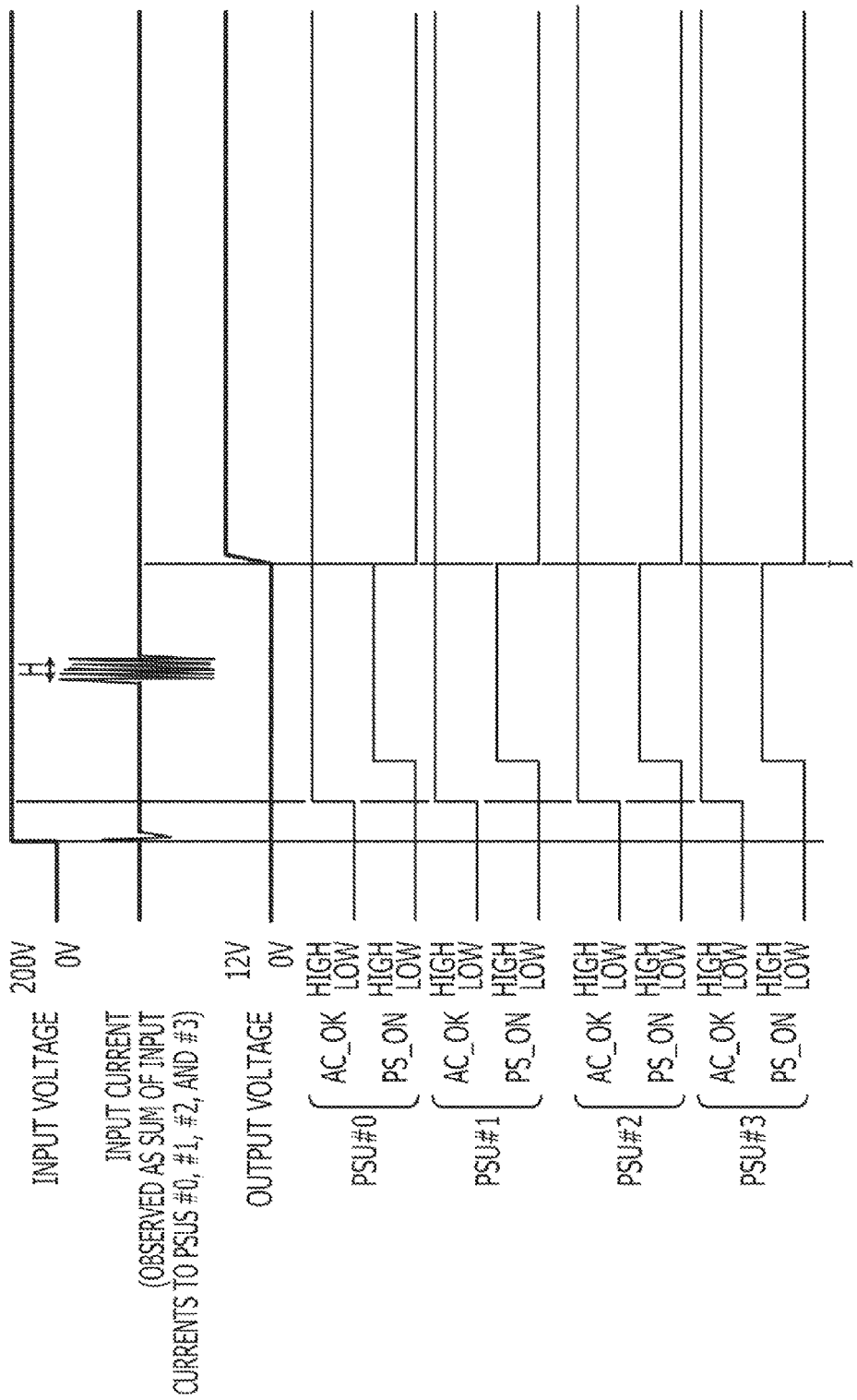
FIG. 6 is a timing chart of a process performed by a power source system.
Figure 7:
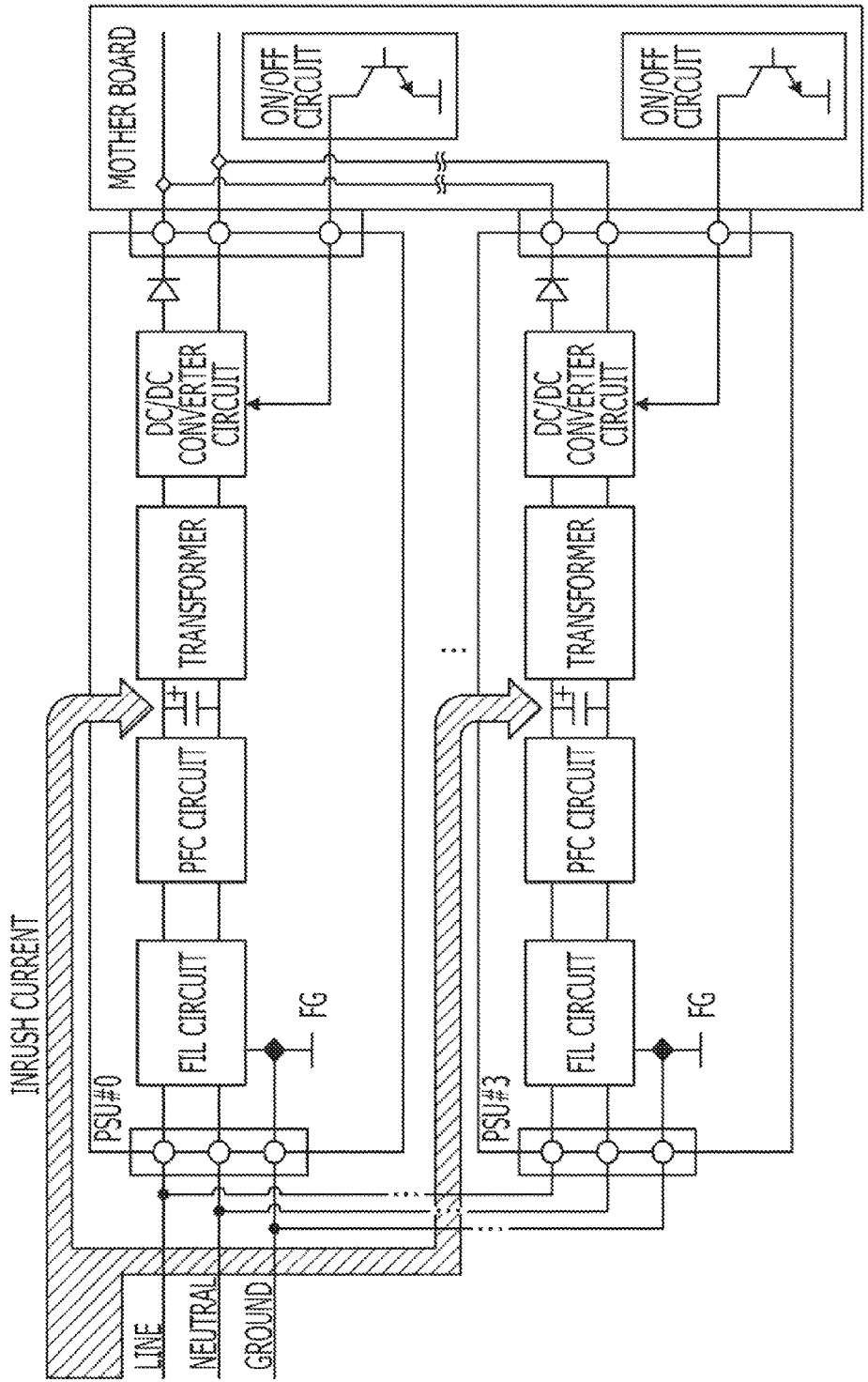
FIG. 7 illustrates inrush currents generated on the power source system.
Figure 8:
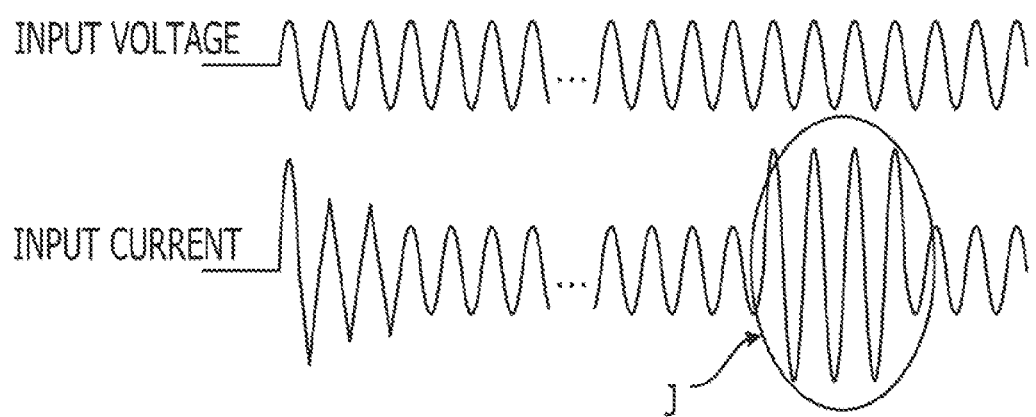
FIG. 8 illustrates inrush currents overlapping each other.

FIG. 6 is a timing chart illustrating a process performed by the power source system of an example other than the embodiment. FIG. 7 illustrates inrush currents generated on the power source system of the example. FIG. 8 illustrates the inrush currents generated on the power source system illustrated in FIG. 7 and overlapping each other.

In the example illustrated in FIG. 6, the voltages PS_ON corresponding to the PSUs #0 to #3 are brought to the Low state at the same time at timing H. Thus, the power source system of FIG. 6 starts the PSUs #0 to #3 at the same time at the timing indicated by H, and inrush currents to the PFC circuits provided in the PSUs #0 to #3 are generated at the same time. Therefore, in the power source system of FIG. 6, the inrush currents to the PSUs #0 to #3 overlap each other to result in a high inrush current.

In the power source system illustrated in FIG. 7, a voltage is applied to the respective PFC circuits of the PSUs #0 to #3 at the same time, and thus inrush currents to the PSUs #0 to #3 are generated at the same time, which results in a high inrush current. Therefore, as indicated by J in FIG. 8, a high input current is generated after the power source system of FIG. 7 is started.

Figure 9:
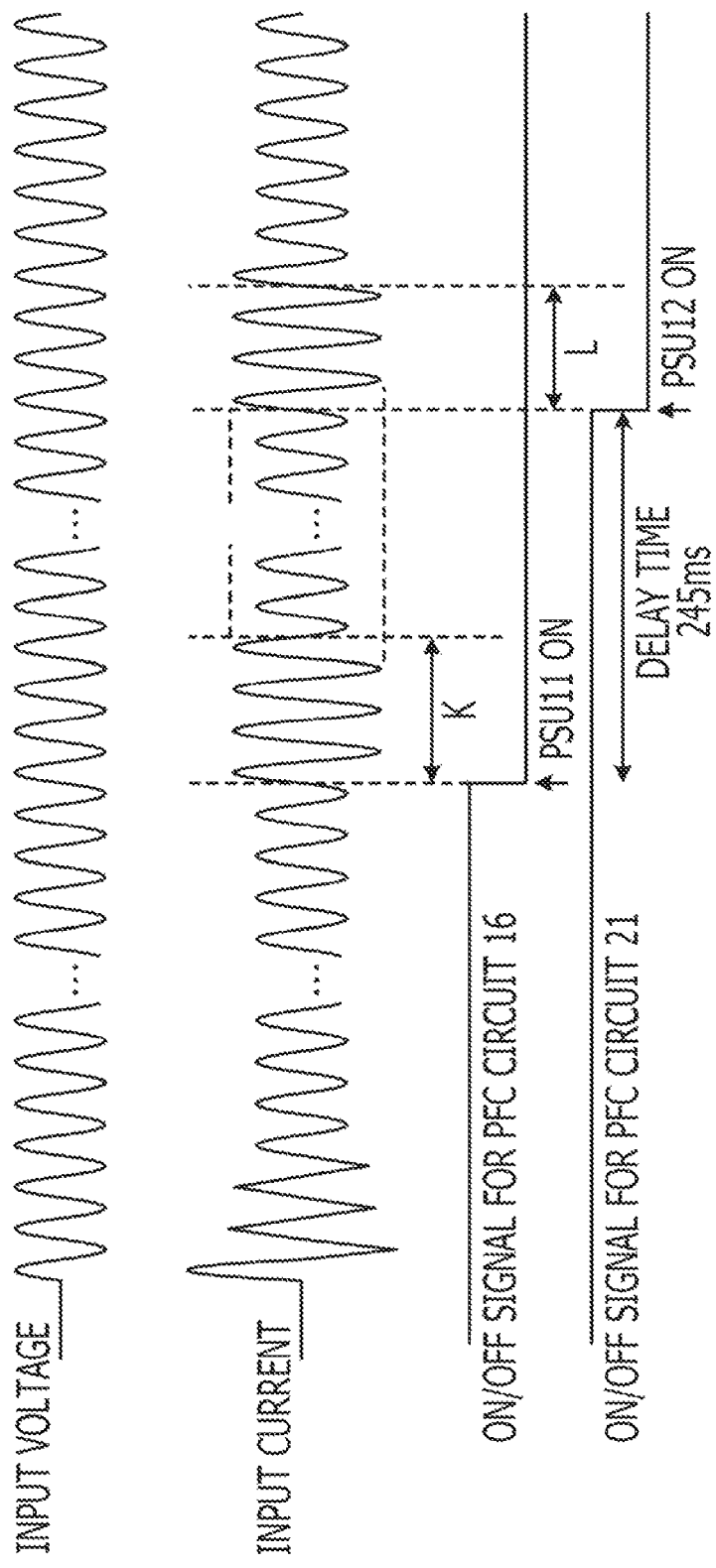
FIG. 9 illustrates inrush currents generated on the power source system according to the second embodiment.

FIG. 9 illustrates inrush currents generated on the power source system according to the second embodiment. In the power source system 10 according to the second embodiment, as illustrated in FIG. 9, a delay time of 245 ms is provided between a start signal for starting the PFC circuit 16 and a start signal for starting the PFC circuit 21. An inrush current to the PFC circuit 16 is generated at the time indicated by K. Meanwhile, an inrush current to the PFC circuit 21 is generated at the time indicated by L. Therefore, the power source system 10 starts the PFC circuits such that inrush currents to the PFC circuits are generated at different times as indicated by K and L of FIG. 9, and thus an inrush current generated when the power source system 10 is started can be reduced to a level corresponding to one PSU.

As discussed above, the power source system 10 according to the second embodiment includes the switches 17 to 32 which supply electric power supplied from the outside to the corresponding PFC circuits 16 to 31 to start the PFC circuits 16 to 31 when a start signal for instructing the PFC circuits 16 to 31 to start an operation is acquired. The power source system 10 also includes the MB 35 which sequentially outputs start signals for instructing the PFC circuits 16 to 31 to start an operation to the PFC circuits 16 to 31 at specified time intervals.

Therefore, the power source system 10 can start the PSUs 11 to 14 such that inrush currents to the PFC circuits 16 to 31 are generated at shifted times, which reduces inrush currents for a plurality of power sources generated when the power source system 10 is started from overlapping each other to become high. In addition, the power source system 10 does not require a UPS or a power distribution switchboard that covers a high inrush current, which reduces the circuit size of the power source system.

The MB 35 can sequentially output start signals for instructing the PFC circuits 16 to 31 to start an operation to the PFC circuits 16 to 31 at specified time intervals that are longer than the time period since generation until settlement of an inrush current generated when each of the PFC circuits 16 to 31 is started. Therefore, the power source system 10 can set the upper limit of the inrush current generated when the power source system 10 is started to a level corresponding to one PSU.

The MB 35 includes capacitors with different capacitances respectively for the PFC circuits 16 to 31. The MB 35 applies a voltage to each of the capacitors to sequentially output start signals for instructing the PFC circuits 16 to 31 to start an operation to the PFC circuits 16 to 31 in accordance with variations in voltage of each of the capacitors.

Therefore, the power source system 10 can vary as desired the times at which inrush currents are generated just by replacing the capacitors provided in the on/off circuits 36 to 39.

While embodiments of the present invention have been described above so far, the present invention may be implemented in various different forms rather than the embodiments discussed above. Accordingly, another embodiment of the present invention will be described below as a third embodiment.

(1) Regarding Time-Differential Power-on Circuit

While the MB 35 discussed above uses capacitors with different capacitances to sequentially output start signals for instructing the PFC circuits 16 to 31 to start an operation, the present invention is not limited thereto. For example, an external power source board may use a plurality of timer ICs uniquely corresponding to the PFC circuits to sequentially output start signals for instructing the PFC circuits to start an operation to the PFC circuits at specified time intervals.

Figure 10:
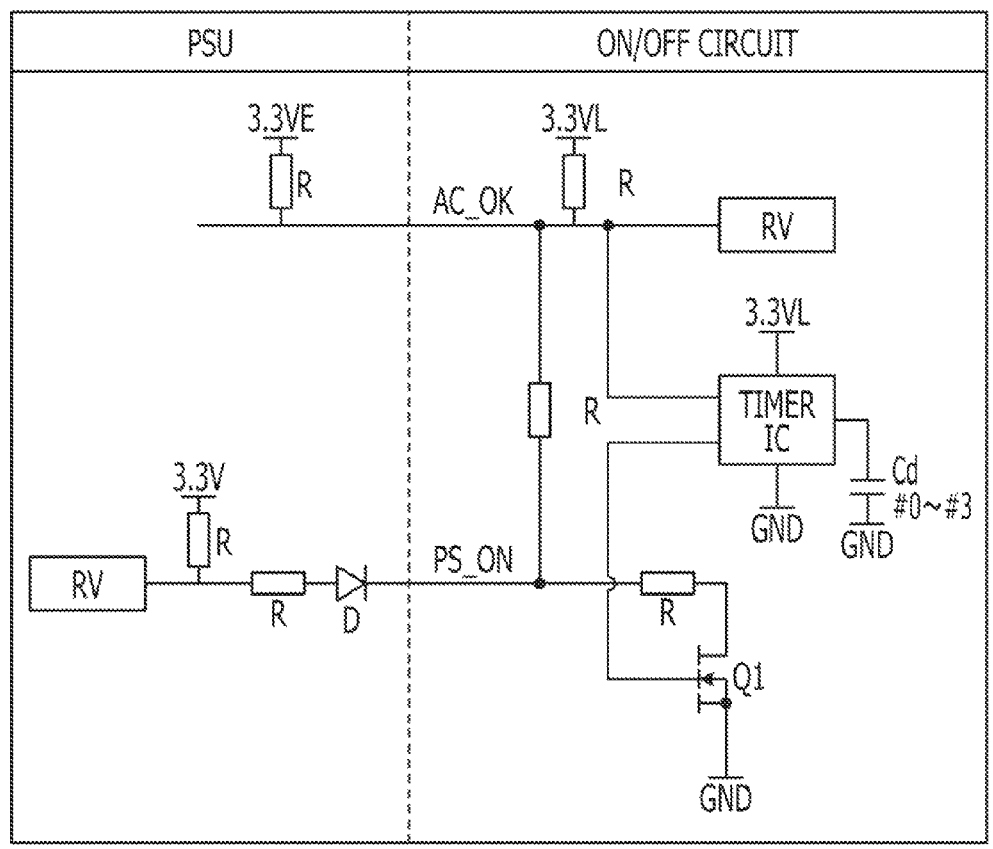
FIG. 10 illustrates a delay circuit that uses a timer IC.

An example that uses a timer circuit will be specifically described below with reference to FIG. 10. FIG. 10 illustrates a delay circuit that uses a timer IC. FIG. 10 illustrates an on/off circuit including a timer IC in place of a time-differential power-on circuit.

When AC_OK is brought to the High state, for example, the timer IC detects that AC_OK is in the High state, and starts charging the capacitor Cd. Then, when the capacitor Cd is completely charged, the timer IC turns on Q1 to cause PS_ON to transition from the High state to the Low state. Therefore, the on/off circuit can instruct the PFC circuit to start an operation a specified period after AC_OK is brought to the High state.

The external power source board includes a plurality of such on/off circuits with the timer ICs provided respectively for the PSUs. With the capacitances of the capacitors connected to the timer ICs of the on/off circuits varied appropriately, the PFC circuits can be started at shifted times. Consequently, overlapping of inrush currents can be reduced by using general-purpose timer ICs, and therefore the circuit design of a power source system with such an external power source board can made easier. In the power source system, in addition, the times at which inrush currents are generated can be varied easily and finely by changing the settings of the timer ICs or replacing the timer ICs.

(2) Regarding External Power Source Board

The on/off circuits 36 to 39 according to the second embodiment are provided separately from the PSUs 11 to 14, respectively. However, embodiments are not limited thereto. For example, the on/off circuits 36 to 39 may be built in the PSUs 11 to 14, respectively.

(3) Regarding Capacitances of Capacitors

In the power source system according to the second embodiment, the PSUs 11 to 14 are started at intervals of 245 ms. However, embodiments are not limited thereto. The PSUs 11 to 14 may be started at longer intervals. The capacitances of the capacitors provided in the time-differential power-on circuits 40 and 43 may be varied appropriately.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A power source system comprising:
   power-factor modifying circuits to modify a power factor of supplied electric power; and
   a time difference circuit to output start signals for instructing the power-factor modifying circuits to start an operation to the power-factor modifying circuits at specified time intervals,
   wherein the power-factor modifying circuits respectively include a switch, and
   each switch receives the electric power for the power-factor modifying circuit to start the power-factor modifying circuit when each switch turns on based on the start signals output from the time difference circuit, and continuously passes the electric power to the power-factor modifying circuits while the power-factor modifying circuits are operating after starting to supply the electric power to the power-factor modifying circuits.

2. The power source system according to claim 1, wherein the time difference circuit sequentially outputs the start signals to the power-factor modifying circuits at time intervals that are longer than a time period since generation until settlement of an inrush current generated when the supplied electric power is supplied to the power-factor modifying circuits.

3. The power source system according to claim 1, wherein the time difference circuit includes a plurality of capacitors with different capacitances respectively for the power-factor modifying circuits, and applies a voltage to each of the capacitors to sequentially output the start signals to the power-factor modifying circuits in accordance with variations in voltage of each of the capacitors.

4. The power source system according to claim 1, wherein the time difference circuit includes a timer that measures a time, and measures different time intervals respectively for the power-factor modifying circuits using the timer to sequentially output the start signals to the power-factor modifying circuits based on time measurement results.

5. A power source control circuit comprising:
   power-factor modifying circuits modifying a power factor of supplied electric power;
   a time difference circuit to output start signals for instructing the power-factor modifying circuits to start an operation to the power-factor modifying circuits at specified time intervals; and
   a switch to receive the electric power for a power-factor modifying circuit to start the power-factor modifying circuit when the switch turns on based on the start signals output from the time difference circuit,
   wherein the switch is included in the power-factor modifying circuits, and continuously passes the supplied electric power to the power-factor modifying circuit while the power-factor modifying circuit is operating after starting to supply the electric power to the power-factor modifying circuit.

6. The power source control circuit according to claim 5, wherein the time difference circuit sequentially outputs the start signals to the power-factor modifying circuits at time intervals that are longer than a time period since generation until settlement of an inrush current generated when the electric power is supplied to the power-factor modifying circuits.

7. The power source control circuit according to claim 5, wherein the time difference circuit applies a voltage to each of a plurality of capacitors with different capacitances provided respectively for the power-factor modifying circuits to sequentially output the start signals to the power-factor modifying circuits at specified time intervals in accordance with an amount of electric power accumulated in each of the capacitors.

8. The power source control circuit according to claim 5, wherein the time difference circuit sequentially outputs the start signals to the power-factor modifying circuits at specified time intervals using a timer that measures the specified time intervals respectively for the power-factor modifying circuits.

* * * * *